Dec. 11, 1956

H. E. PAPE 2,773,555

DEAERATORS

Filed Dec. 21, 1954

United States Patent Office 2,773,555
Patented Dec. 11, 1956

2,773,555

DEAERATORS

Harry E. Pape, Norwood, Pa., assignor to American Viscose Corporation, Philadelphia, Pa., a corporation of Delaware Application December 21, 1954, Serial No. 476,806

12 Claims. (Cl. 183—2.5)

This invention relates to deaerators, and more particularly to a device for removing air bubbles from a stream of artificial textile fiber spinning fluid such as viscose.

A disadvantage of deaerating devices used in the past for removing entrapped air bubbles from viscose has been excessive size, weight and cost. Furthermore, many of such machines have not demonstrated separating efficiency commensurate with their size and cost. The present invention has therefore for its primary object the provision of a simple, efficient and inexpensive deaerator which is especially efficacious in separating entrapped air or gas from a liquid stream such as viscose.

A further object of the invention is to provide a chamber through which liquid carrying entrapped gas is pumped and a conical member in the chamber having a screen or foraminous element in spaced relation thereto so that the liquid is delivered to the top of the screen to flow downwardly therethrough and onto the conical member. A suitable vacuum is maintained in the chamber for the removal of the gas.

Figure 1:
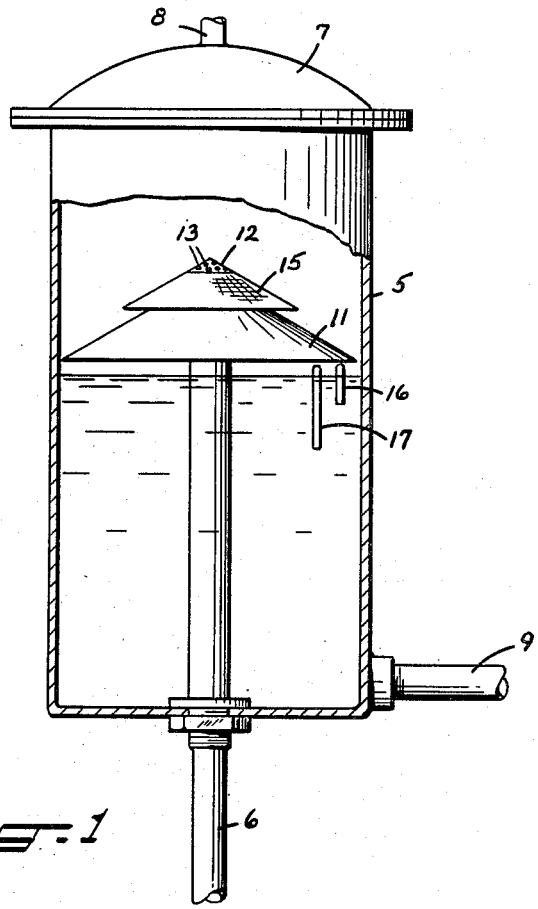
Figure 2:
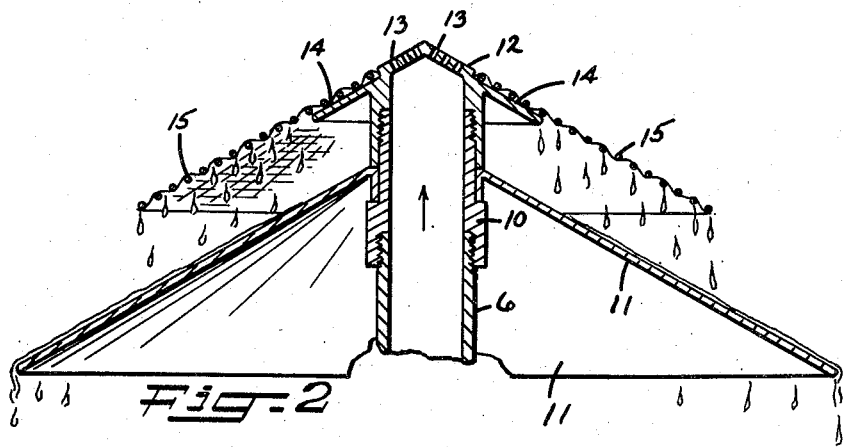

Further objects will be apparent from the specification and drawings in which:

Figure 1 is a longitudinal sectional view of a deaerator constructed in accordance with the present invention; and Figure 2 is an enlarged sectional detail of a part of the structure of Figure 1.

The invention comprises essentially the provision of a cylindrical chamber having a liquid inlet pipe extending vertically upward through the center of the chamber to a point near the top thereof. The inlet pipe discharges the liquid through a perforated screen which is generally conical in shape so that the liquid flows downwardly over the screen and through the screen onto an imperforate conical disc which distributes the liquid around the inner periphery of the chamber.

Referring now more particularly to the drawings, I provide a vacuum chamber 5 having an inlet pipe 6 entering at the bottom thereof and extending upwardly into the chamber. The chamber is provided with a detachable cover 7 to which a vacuum conduit 8 connects the chamber to a suitable source of vacuum. This vacuum may be on the order of eighteen inches depending upon the viscosity of the liquid. The bottom of the chamber is also provided with a discharge conduit 9 which may be connected to suitable pumps in accordance with conventional practice. Intake conduit or pipe 6 extends approximately ¾ of the height of the chamber and has attached thereto a coupling 10 which carries a conical, imperforate disc 11 extending downwardly into the chamber and providing a narrow annular passage of approximately one-sixteenth of an inch between the periphery of the disc and the inside of the chamber. Also mounted on coupling 10 is a cap 12 which has perforations 13 near the top thereof and may, if desired, be formed with a truncated conical surface 14 generally parallel to the surface of disc 11. A screen or perforated member 15 is secured to surface 14 and extends downwardly and generally parallel to the surface of disc 11 but is preferably shorter than the disc.

The viscose or other liquid is fed upwardly through pipe 6 from whence it flows through perforations 13 and downwardly over and through screen 15. The mesh of the screen is selected to break up the stream into relatively small particles or droplets so that entrapped air or gas is readily carried away through the conduit 8. If desired a pair of probes 16 and 17 may be provided to maintain a constant level of liquid in the chamber. After passing through the screen 15, the liquid forms a thin, solid film on the upper surface of disc 11 which further assists in removing entrapped gas. This film flows downwardly around and toward the periphery of the chamber and meets the predetermined liquid level in the chamber without further agitation or turbulence which would re-introduce gas bubbles to the liquid. The screen 15, because of its inherent construction, assists in breaking up the liquid flowing over the top thereof so that substantially all the liquid passes through the screen rather than across it. This is a distinct advantage compared to a perforated disc where the surface tension would inhibit rather than induce flow of the liquid through the perforations. It will be understood however that the nature and viscosity of the liquid dictates the form of element 15.

The device is extremely simple and efficient and provides maximum efficiency for the minimum cost.

Having thus described my invention, I claim:

1. A deaerator for liquids which comprises a vacuum chamber, a liquid conduit extending upwardly into said vacuum chamber, a liquid interrupting screen carried adjacent the top of said conduit, a conical disc carried by said conduit below said screen and in spaced relation thereto, said conical disc being in position to receive substantially all the liquid passing through said screen, and a discharge conduit extending from the bottom of the chamber.

2. A viscose deaerator comprising a cylindrical chamber, a vacuum conduit connected to the top of said chamber, a viscose inlet conduit extending upwardly and centrally of said chamber, a viscose discharge conduit connected to the bottom of said chamber, a downwardly flaring imperforate conical disc mounted in the chamber on said inlet conduit, said disc having its peripheral edge terminating in close spaced relation to the inner periphery of the chamber, means on the conduit for delivering the viscose from the inlet conduit to a position above said disc and a mesh screen carried by said means and adapted to intercept viscose flow to said disc as it is delivered by said means.

3. Apparatus in accordance with claim 2 in which the disc extends to within substantially one-sixteenth of an inch of the inner periphery of the chamber.

4. Apparatus in accordance with claim 5 in which the screen is substantially parallel to and in spaced relation to the disc.

5. Apparatus in accordance with claim 4 in which said means is a coupling, and the screen is mounted on a perforated cap fixed to the top of the coupling.

6. A deaerator for liquids including a vacuum chamber, a liquid inlet conduit extending upwardly into said chamber, a screen having a downwardly sloping wall carried by said conduit adjacent its upper end and adapted to receive the liquid issuing therefrom, a disc carried by said conduit below said screen and adapted to receive the liquid passing over and through said screen, and a liquid discharge conduit extending from the bottom of said chamber.

7. A construction as defined in claim 6 wherein said disc includes a downwardly sloping wall.

8. A deaerator for liquids including a vacuum chamber, a liquid inlet conduit extending upwardly into said chamber, a perforated cap supported at the upper end of said conduit, a screen having a downwardly sloping wall carried by said perforated cap and adapted to receive the liquid issuing from said conduit, a disc carried by said conduit below said screen and adapted to receive the liquid passing over and through said screen, and a liquid discharge conduit extending from the bottom of said chamber.

9. A construction as defined in claim 8 wherein the top portion of said perforated cap is conical and coextensive with the sloping wall of said screen.

10. A construction as defined in claim 8 wherein said disc is a downwardly flaring cone having its peripheral edge in close spaced relation to the inner periphery of the chamber to facilitate liquid discharge from the disc and onto the inner periphery of the chamber with a minimum of agitation.

11. A deaerator for liquids including a vacuum chamber, a liquid inlet conduit extending upwardly into said chamber, a screen having a downwardly flaring wall carried by said conduit adjacent its upper end and adapted to receive the liquid issuing therefrom, a downwardly flaring conical disc carried by said conduit below said screen and in spaced relationship therewith, said disc being adapted to receive the liquid passing over and through said screen and deliver the same onto the inner periphery of said chamber, and a liquid discharge conduit extending from the bottom of said chamber.

12. A construction as defined in claim 11 wherein said screen is conical.

References Cited in the file of this patent

UNITED STATES PATENTS

| | | |
|---|---|---|
| 1,499,710 | Weisgerber | July 1, 1924 |
| 1,549,894 | Adams | Aug. 18, 1925 |
| 2,355,057 | Copeland | Aug. 8, 1944 |